United States Patent
McDonald et al.

(10) Patent No.: US 8,205,599 B2
(45) Date of Patent: Jun. 26, 2012

(54) SYSTEM AND METHOD FOR CLEANING SOLENOID VALVE DEBRIS

(75) Inventors: Mike M. McDonald, Macomb, MI (US); William C. Albertson, Clinton Township, MI (US)

(73) Assignee: GM Global Technology Operations LLC

( * ) Notice: Subject to any disclaimer, the term of this patent is extended or adjusted under 35 U.S.C. 154(b) by 320 days.

(21) Appl. No.: 12/686,607

(22) Filed: Jan. 13, 2010

(65) Prior Publication Data

US 2011/0168131 A1    Jul. 14, 2011

(51) Int. Cl.
 *F02D 7/00* (2006.01)
 *F02D 7/02* (2006.01)

(52) U.S. Cl. .................................... 123/481; 123/198 F

(58) Field of Classification Search .............. 123/481, 123/325, 332, 198 F, 90.12; 701/103, 112; 73/114.79, 114.77
 See application file for complete search history.

(56) References Cited

U.S. PATENT DOCUMENTS

| | | | |
|---|---|---|---|
| 4,401,069 A * | 8/1983 | Foley .......................... | 123/198 F |
| 4,452,037 A | 6/1984 | Waddington et al. | |
| 6,213,173 B1 | 4/2001 | Bedi et al. | |
| 6,557,518 B1 | 5/2003 | Albertson et al. | |
| 6,584,942 B1 | 7/2003 | Albertson et al. | |
| 6,745,735 B2 | 6/2004 | Smith | |
| 6,772,724 B2 * | 8/2004 | Glugla et al. ............... | 123/179.5 |
| 7,441,451 B2 * | 10/2008 | McDonald et al. ......... | 73/114.79 |
| 7,562,530 B2 | 7/2009 | Kolmanovsky | |
| 7,765,052 B2 | 7/2010 | Kaiser et al. | |
| 2006/0260323 A1 | 11/2006 | Moulebhar | |
| 2008/0183373 A1 * | 7/2008 | McDonald et al. ........... | 701/111 |
| 2009/0150055 A1 | 6/2009 | Kaiser et al. | |
| 2010/0154526 A1 * | 6/2010 | Cinpinski et al. ........... | 73/114.79 |

OTHER PUBLICATIONS

Stabinsky, Mark et al., "Active Fuel Management(TM) Technology: Hardware Development on a 2007 GM 3.9L V6 OHV SI Engine," 07PFL-431, SAE International, 2007, 11 pgs, 2007.
U.S. Appl. No. 12/572,526, filed Oct. 2, 2009, Hicks et al.
Albertson, William et al., "Displayment on Demand for Improved Fuel Economy without Compromising Performance in GM's High Value Engines," Powertrain International, pp. 25-40, Sep. 29, 2004.

* cited by examiner

*Primary Examiner* — Mahmoud Gimie

(57) ABSTRACT

An engine control system includes an active fuel management (AFM) control module that selectively enables and disables an AFM mode using at least one AFM valve. The engine control system further includes a solenoid fault correction module that selectively opens and closes at least one AFM valve when AFM mode is disabled.

18 Claims, 6 Drawing Sheets

SYSTEM AND METHOD FOR CLEANING SOLENOID VALVE DEBRIS

FIELD

The present invention generally relates to systems and methods for cleaning solenoid valves in vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines may include engine control systems that deactivate cylinders under low load situations. For example, an eight cylinder engine can be operated using four cylinders to improve fuel economy by reducing pumping losses. This process is generally referred to as active fuel management (AFM). Operation using all of the engine cylinders is referred to as an "activated" mode (i.e., an AFM mode is disabled). A "deactivated" mode (i.e., the AFM mode is enabled) refers to operation using less than all of the cylinders of the engine (i.e. one or more cylinders not active). In the deactivated mode, there are fewer cylinders operating. Engine efficiency is increased as a result of less engine pumping loss and higher combustion efficiency.

SUMMARY

An engine control system includes an active fuel management (AFM) control module that selectively enables and disables an AFM mode using at least one AFM valve. The engine control system further includes a solenoid fault correction module that selectively opens and closes at least one AFM valve when AFM mode is disabled.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
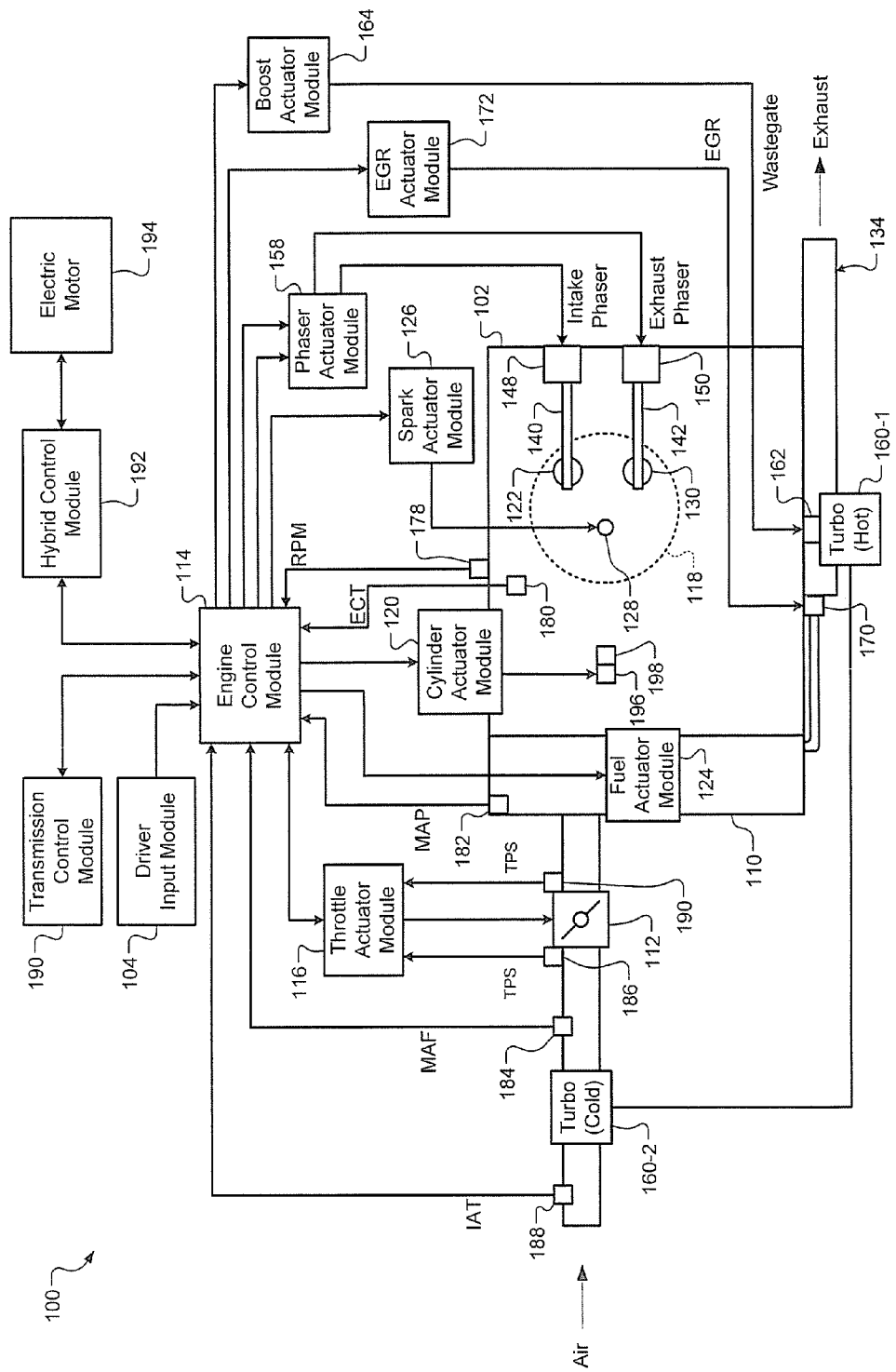
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An internal combustion engine may include an engine control system that deactivates cylinders under low load situations, which may be referred to as Active Fuel Management (AFM). At least one AFM solenoid may be used to activate and deactivate the cylinders. The AFM solenoid may include an AFM solenoid valve. Debris may contaminate the valve, which adversely affects cylinder activation and deactivation. The engine control system according to the present disclosure cleans the solenoid valve.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. A control module 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The control module 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The control module 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the control module 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the control module 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The control module 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 178. The temperature of the engine coolant may be measured using an engine coolant temperature (ECT) sensor 180. The ECT sensor 180 may be located within the engine 102 or at other locations where the coolant is circulated, such as a radiator (not shown).

The pressure within the intake manifold 110 may be measured using a manifold absolute pressure (MAP) sensor 182. In various implementations, engine vacuum, which is the difference between ambient air pressure and the pressure within the intake manifold 110, may be measured. The mass flow rate of air flowing into the intake manifold 110 may be measured using a mass air flow (MAF) sensor 184. In various implementations, the MAF sensor 184 may be located in a housing that also includes the throttle valve 112.

The throttle actuator module 116 may monitor the position of the throttle valve 112 using one or more throttle position sensors (TPS) 186. The ambient temperature of air being drawn into the engine 102 may be measured using an intake air temperature (IAT) sensor 188. The control module 114 may use signals from the sensors to make control decisions for the engine system 100.

The control module 114 may communicate with a transmission control module 190 to coordinate shifting gears in a transmission (not shown). For example, the control module 114 may reduce engine torque during a gear shift. The control module 114 may communicate with a hybrid control module 192 to coordinate operation of the engine 102 and an electric motor 194.

The electric motor 194 may also function as a generator, and may be used to produce electrical energy for use by vehicle electrical systems and/or for storage in a battery. In various implementations, various functions of the control module 114, the transmission control module 190, and the hybrid control module 192 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The control module 114 may control actuator values in order to generate a desired torque from the engine 102.

The control module 114 may determine when to activate or deactivate cylinders based on an active fuel management (AFM) control algorithm. The control module 114 may selectively enable and disable an AFM mode based on various engine operating conditions.

When the AFM mode is enabled, one or more AFM solenoids may deactivate one or more cylinders. While the engine system 100 may include multiple AFM solenoids, for illustration purposes a single representative AFM solenoid 196 is shown. For example, an AFM solenoid 196, when energized, may selectively open an AFM solenoid valve 198. With the AFM solenoid valve 198 open, hydraulic fluid may activate a hydraulic mechanism (not shown), which may hold the intake valve 122 and/or the exhaust valve 130 closed to deactivate the cylinder 118.

When the AFM mode is disabled, one or more cylinders are activated by one or more AFM solenoids 196. For example, the AFM solenoid 196, when de-energized, may selectively close the AFM solenoid valve 198. With the AFM solenoid valve 198 closed, hydraulic fluid no longer activates the hydraulic mechanism (not shown), and the intake valve 122 and/or exhaust valve 130 will resume operation, activating the cylinder 118.

The control module 114 may perform diagnostics on the AFM solenoid valve 198 based on various engine operating conditions. For example, the control module 114 may evaluate the timing between the AFM solenoid valve 198 operation and the AFM solenoid 196 energizing/de-energizing. Delays in the timing may be caused by debris collecting on the AFM solenoid valve 198. In the case of a fault with the AFM solenoid valve 198, the control module 114 may perform maintenance on the AFM solenoid valve 198.

Figure 2:
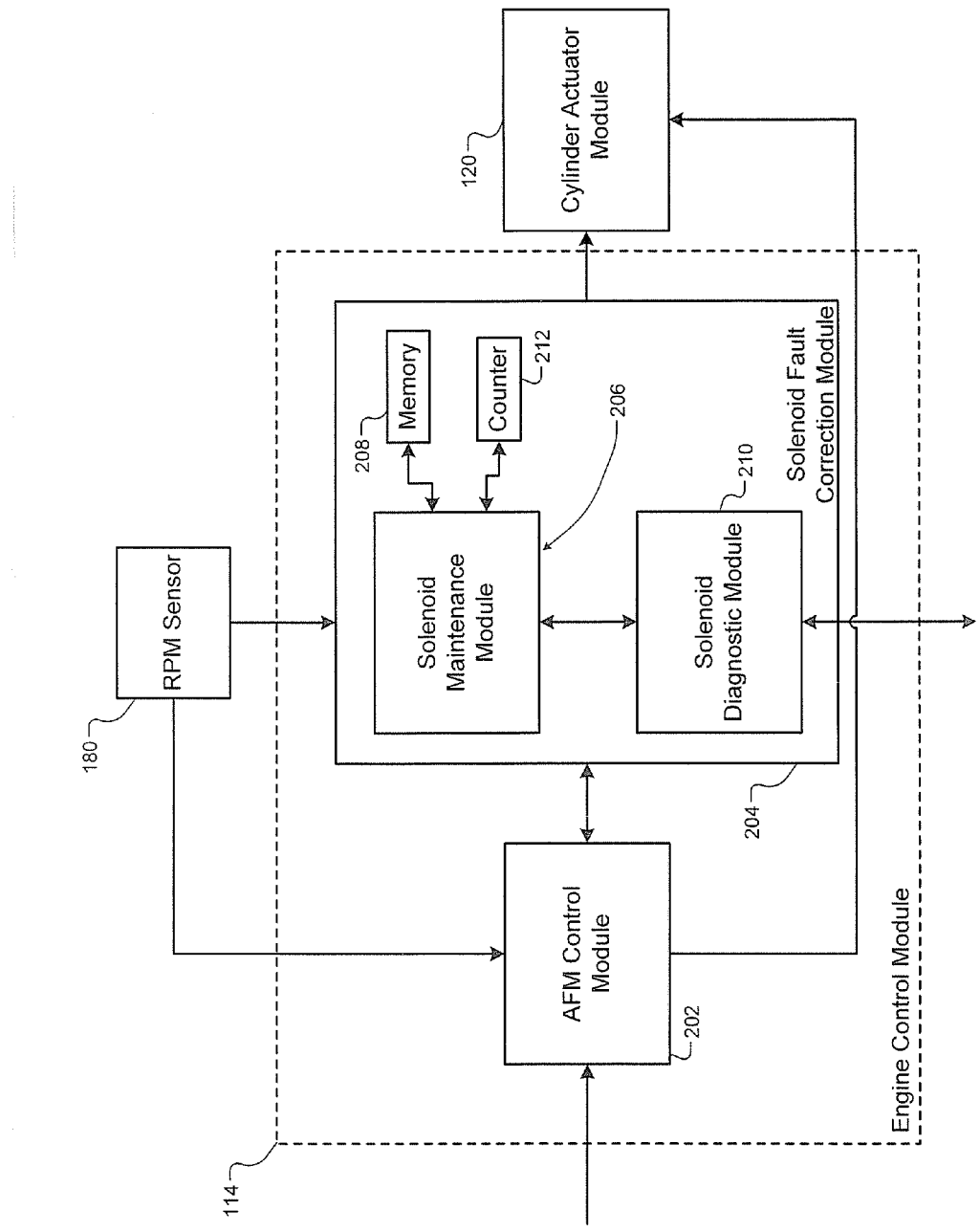
FIG. 2 is a functional block diagram of an exemplary control module according to the principles of the present disclosure.

Referring now to FIG. 2, a functional block diagram of an exemplary engine control module 114 according to the principles of the present disclosure is shown. The engine control module 114 includes an AFM control module 202 and a solenoid fault correction module 204. The AFM control module 202 selectively enables and disables the AFM mode based on various operating conditions. For example, the AFM control module 202 may enable AFM mode if manifold absolute pressure is below a manifold absolute pressure threshold. The AFM control module 202 may monitor the status of the AFM mode and may generate faults when problems are detected. For example, if the timing between AFM solenoid valve operation and AFM solenoid energizing/de-energizing is delayed, a fault may be generated. The solenoid fault correction module 204 corrects faults in the AFM solenoid valve 198 operation. The solenoid fault correction module 204 may include a solenoid maintenance module 206, memory 208, and a solenoid diagnostic module 210.

When the AFM control module 202 detects an AFM solenoid valve fault, the AFM control module 202 disables the AFM mode. The solenoid fault correction module 204 performs diagnostics and corrects the fault. The solenoid fault correction module 204 sends the AFM control module 202 either a "pass" or "fail" value. If the AFM control module 202 receives a pass value, the AFM mode is re-enabled and normal engine operation resumes. If the AFM control module 202 receives a fail value, the AFM mode remains disabled and the AFM control module 202 may output an AFM solenoid valve failure, which indicates that the vehicle may require service.

The solenoid fault correction module 204 includes the solenoid maintenance module 206, the memory 208, and the solenoid diagnostic module 210. The solenoid maintenance module 206 cleans the AFM solenoid valve. For example, the solenoid maintenance module 206 selectively energizes and de-energizes the AFM solenoid 196 to dislodge debris. The memory 208 stores data used by the solenoid maintenance module 206. The solenoid diagnostic module 210 performs diagnostics on the AFM solenoid valve 198 and may output a value representing either a "pass" or a "fail."

The timing of the solenoid 196 energizing and de-energizing is scheduled by the solenoid maintenance module 206 based on various operating conditions. For example, the solenoid maintenance module 206 may set a first value (e.g., d1), that represents the angle of the camshaft at which the AFM solenoid 196 will be energized. The solenoid maintenance module 206 may set a second value (e.g., d2), that represents a time at which the AFM solenoid 196 will be de-energized. The first and second schedule values (i.e., d1 and d2) are selected so that the energizing and de-energizing of the AFM solenoid 196 does not disrupt normal engine operation. For example, d1 may be set after an intake valve lift begins, and d2 may be set at a time after d1 and before a subsequent exhaust valve lift begins. For example only, d1 may be 30 degrees after the intake valve lift begins, and d2 may be 42 milliseconds after d1, which may represent 252 degrees of camshaft rotation at 1000 RPMs. Those skilled in the art may appreciate that the AFM solenoid may be energized and de-energized one or more times per engine cycle. Furthermore, those skilled in the art may appreciate that the values for d1 and d2 are exemplary and other suitable values may be selected.

The solenoid maintenance module 206 may store information on past diagnostic results to determine whether the cleaning was successful. For example, the solenoid maintenance module 206 may initialize an array filled with four values, wherein each value is initialized to represent a failed cleaning attempt. After each diagnostic test performed by the solenoid diagnostic module 210, the solenoid maintenance module 206 replaces the oldest value in the array with the result of the diagnostic. If all of the values in the array are pass values the solenoid maintenance module 206 may determine that the solenoid valve 198 is clean. Conversely, if any of the values represent a fail, maintenance continues. In other words, the array indicates whether the AFM solenoid valve 198 passed diagnostics a desired number of times in a row. When the solenoid maintenance module 206 determines that the solenoid valve 198 is clean, the solenoid fault correction module 204 sends a pass value to the AFM control module 202. The memory 208 may store data used by the solenoid maintenance module 206.

The solenoid maintenance module 206 selectively cleans the AFM solenoid valve 198 based on the number of times cleaning has previously been performed. For example, the solenoid maintenance module 206 may initialize a counter 212. The counter 212 may indicate how many times the solenoid maintenance module 206 has cleaned the solenoid valve. If the counter 212 is equal to or greater than a counter threshold, solenoid valve maintenance stops and a fail result may be sent back to the solenoid fault correction module 204. Otherwise, the solenoid maintenance module 206 performs cleaning again. The memory 208 may include the counter 212 and store the counter threshold.

The solenoid maintenance module 206 selectively performs solenoid cleaning based on certain operating conditions. For example, the solenoid maintenance module 206 may receive engine speed data from the RPM sensor 178. The solenoid maintenance module 206 may selectively perform cleaning based on the engine speed. For example, when the engine speed is above a predetermined threshold, the solenoid maintenance module 206 may disable cleaning of the solenoid valve 198. For example only, the predetermined threshold may be 1,500 RPMs.

The solenoid maintenance module 206 directs the cylinder actuator module 120 to perform the solenoid energizing and de-energizing. For example, the cylinder actuator module 120 may perform the solenoid energizing and de-energizing based on the schedule values (i.e., d1 and d2). When the solenoid has been energized and de-energized, the solenoid maintenance module 206 directs the solenoid diagnostic module 210 to perform diagnostics on the AFM solenoid valve 198. The solenoid diagnostic module 210 may perform solenoid diagnostics during the same solenoid valve cycle in which the solenoid maintenance module 206 performs solenoid valve cleaning.

The solenoid diagnostic module 210 performs solenoid diagnostics based on various engine operating conditions. The solenoid diagnostic module 210 outputs a value which indicates either a pass or a fail to the solenoid maintenance module 206. The solenoid diagnostic module 210 may also perform solenoid diagnostics in response to a direction from the AFM control module 202 and may output the result directly to the AFM control module 202.

Figure 3:
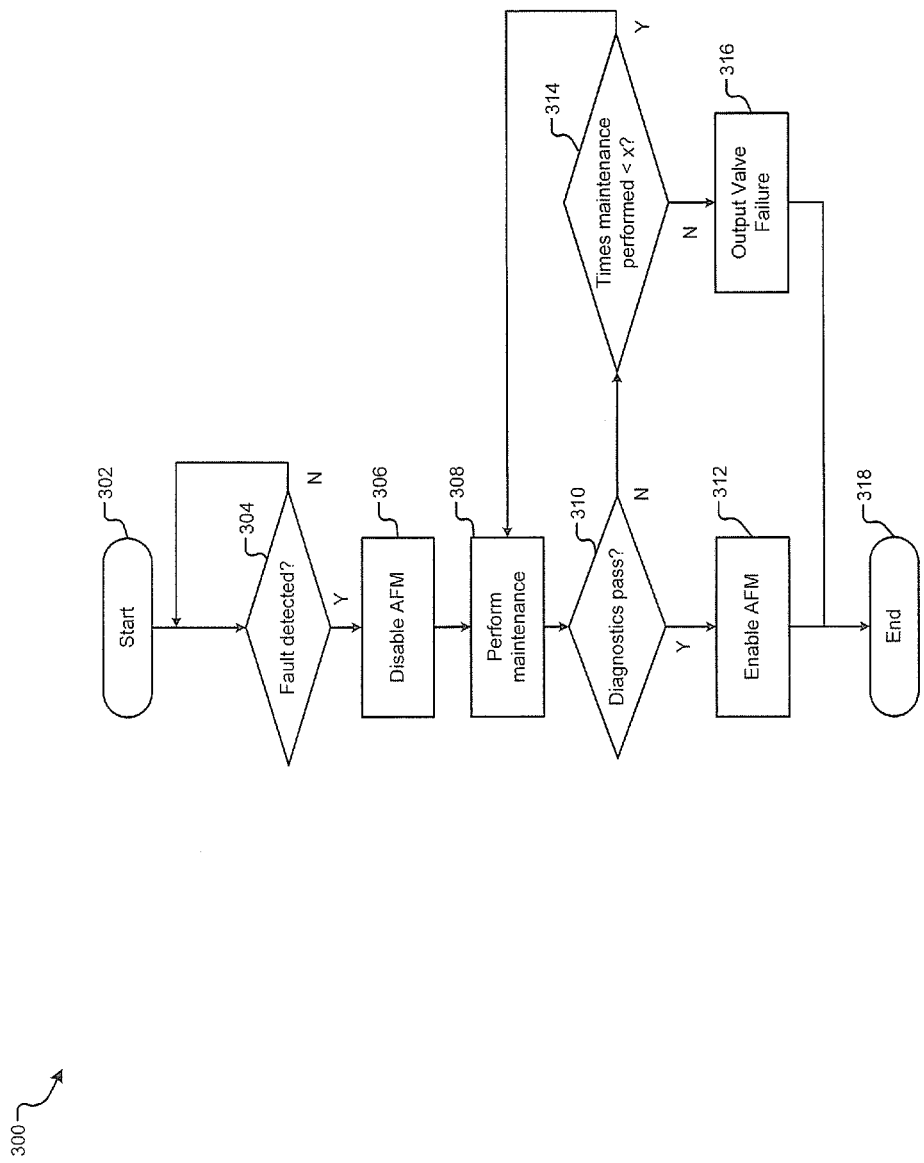
FIG. 3 is a flowchart that depicts exemplary steps performed in an AFM solenoid valve maintenance method according to the principles of the present disclosure.

Referring now to FIG. 3, an AFM solenoid valve maintenance method 300 according to the principles of the present disclosure is shown. In step 304, the method 300 determines whether a fault is detected in an AFM solenoid valve. If yes, the method 300 continues to step 306, where the AFM mode is disabled. If no, the method 300 returns to step 304. In step 308, solenoid valve maintenance is performed.

In step 310, the method 300 determines whether the solenoid valve passed the diagnostic test. If yes, the method 300 continues to step 312; otherwise, the method 300 continues to step 314. In step 312, the AFM mode is enabled and the method 300 ends.

In step 314, the method 300 determines whether the solenoid valve maintenance has been performed a threshold number of times. If valve maintenance has been performed the threshold number of times, the method 300 continues to step 316; otherwise, the method 300 returns to step 308. In step 316, the method 300 outputs an AFM solenoid valve failure and the method 300 ends. In response to the AFM solenoid valve failure, the AFM control module 202 may disable AFM mode of operation and send an indicator to the driver that the vehicle may require service.

Figure 4:
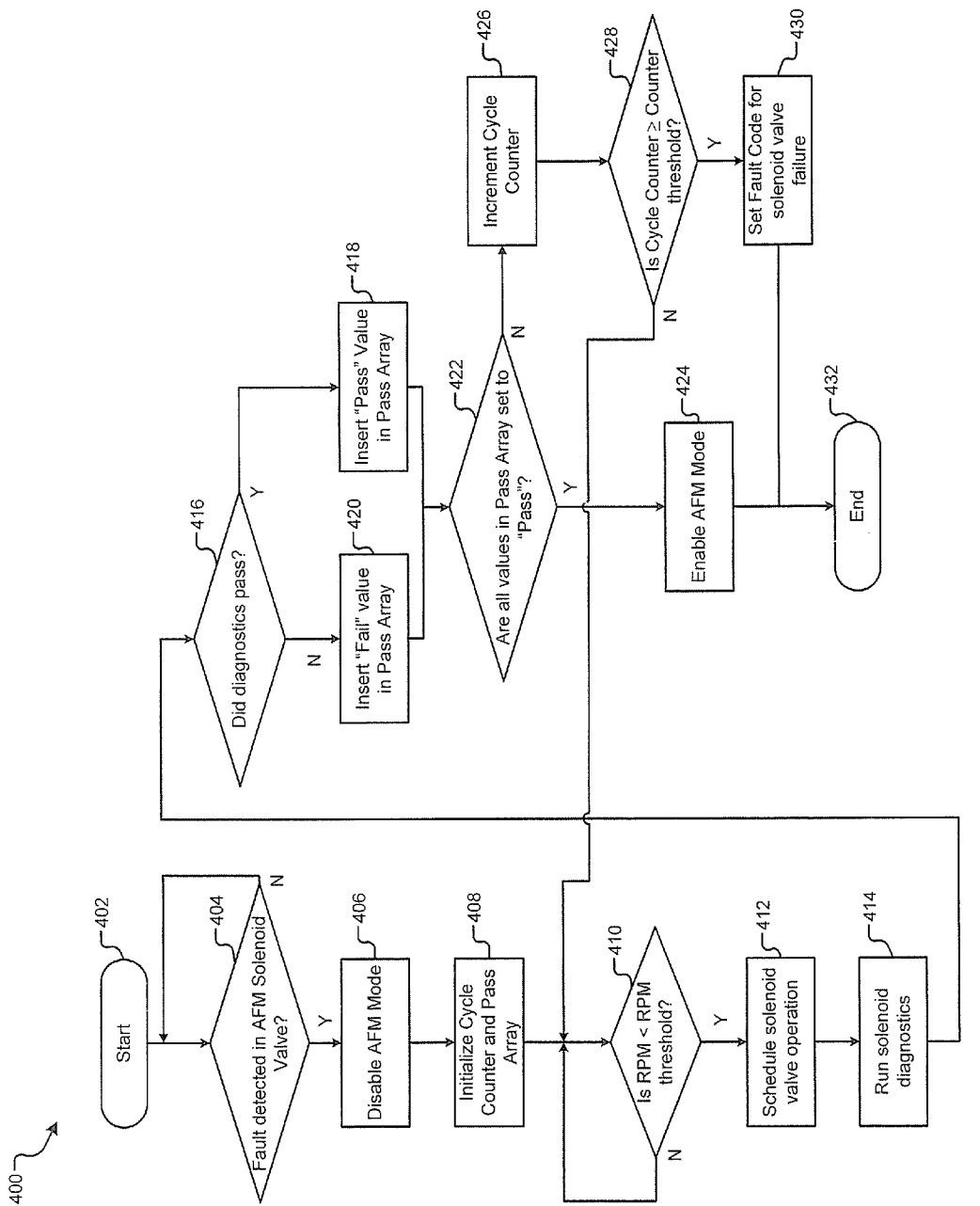
FIG. 4 is a flowchart that depicts exemplary steps performed in a second AFM solenoid valve maintenance method according to the principles of the present disclosure.

Referring now to FIG. 4, another AFM solenoid valve maintenance method 400 according to the principles of the present disclosure is shown. In step 404, the method 400 determines whether a fault is detected in an AFM solenoid valve. If yes, the method 400 continues to step 406, where the AFM mode is disabled. If no, the method 400 returns to step 404.

In step 408, a counter and an array are initialized and the method 400 transfers to step 410. In step 410, the method 400 determines whether an engine speed is below a RPM threshold. If yes, the method 400 continues to step 412. If no, the method 400 returns to step 410.

In step 412, the method schedules and performs AFM solenoid valve operation according to the schedule. In step 414, the method 400 performs AFM solenoid valve diagnostics, and the method 400 continues to step 416.

In step 416, the method 400 determines whether the diagnostics of step 414 passed. If yes, the method 400 continues to step 418. If no, the method 400 continues to step 420. In step 418, the method 400 replaces the oldest value in the array with a pass value, and the method 400 continues to step 422. In step 420, the method 400 replaces the oldest value in the array with a fail value, and the method 400 continues to step 422.

In step 422, the method 400 determines whether all the values of the array indicate pass values. If yes, the method 400 continues to step 424; otherwise, the method 400 continues to step 426. In step 424, the method 400 enables the AFM mode, and the method 400 ends.

In step 426, the method 400 increments the counter and continues to step 428. In step 428, the method 400 determines whether the counter is greater than or equal to a counter threshold. If yes, the method 400 continues to step 430; otherwise, the method 400 returns to step 410.

In step 430, the method 400 disables the AFM mode, outputs an AFM solenoid valve failure indicator, and the method 400 ends.

Figure 5:
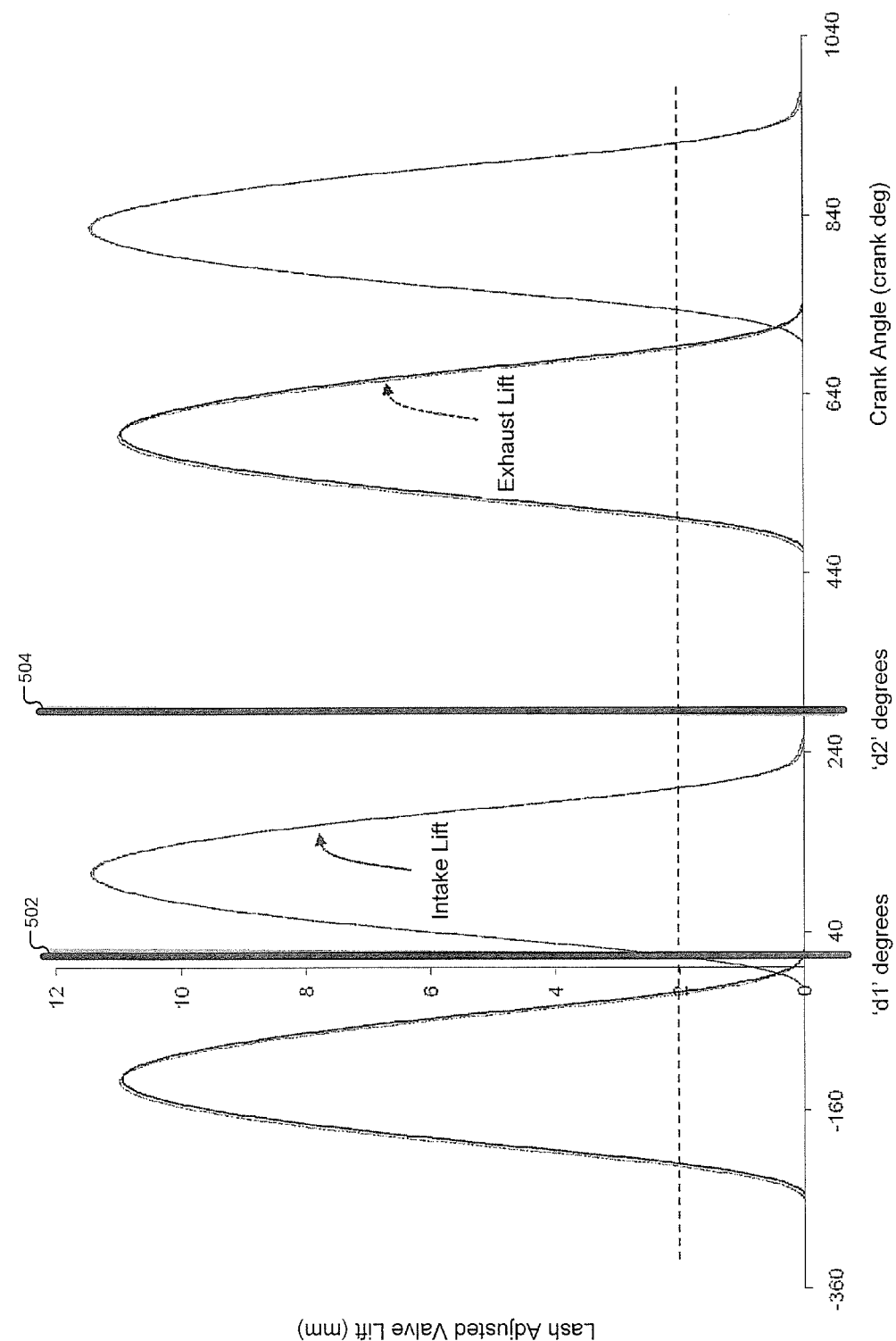
FIG. 5 is a graph that depicts exemplary timing of solenoid energizing and de-energizing according to the principles of the present disclosure.

Referring now to FIG. 5, a graph depicts the timing, in degrees, of exemplary solenoid energizing and de-energizing according to the principles of the present disclosure. The timing of the solenoid energizing (i.e., d1) corresponds to a predetermined angle of the intake camshaft after an intake valve lift begins. For example, the solenoid may be energized 30 degrees after the intake valve lift begins. The timing of the solenoid de-energizing (i.e., d2) corresponds to a time, in milliseconds, after the solenoid is energized and before a subsequent exhaust valve lift begins. For example, the solenoid may be de-energized 42 milliseconds after the solenoid was energized. For example only, 42 milliseconds may indicate a crank angle of 252 degrees at 1000 RPMs.

Figure 6:
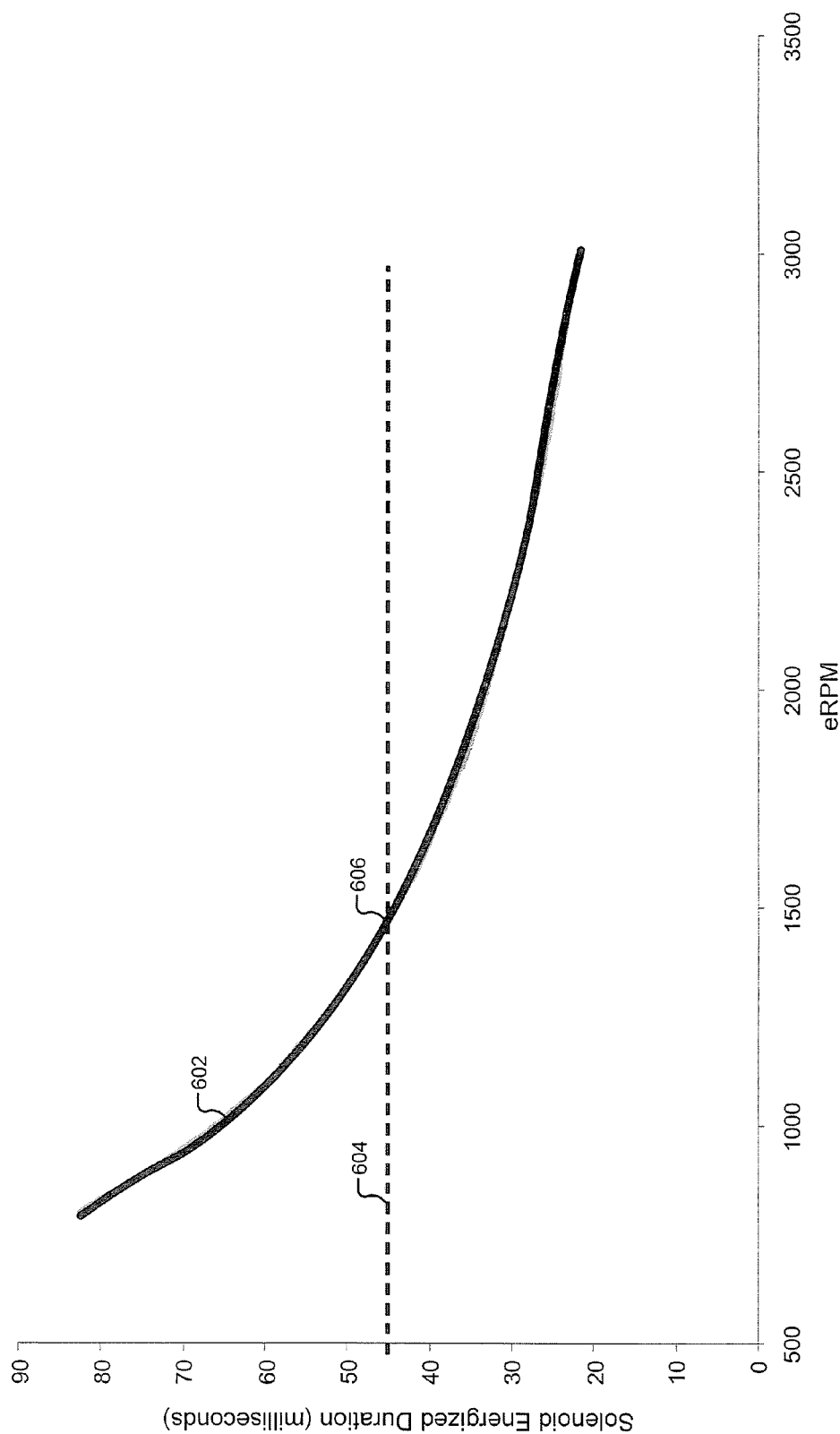
FIG. 6 is a graph that depicts an exemplary time window during which solenoid self-healing is performed according to the principles of the present disclosure.

Referring now to FIG. 6, a graph that depicts the duration that a solenoid is energized as a function of engine speed according to the principles of the present disclosure is shown. 602 represents the time (in milliseconds) that a solenoid can remain energized for a given engine speed (in RPMs). 604 represents a threshold duration for solenoid valve energizing; solenoid energizing below the threshold may be obtrusive to normal engine operation. 606 represents a threshold where the engine speed becomes too high for non-obtrusive solenoid energizing. For example, when the engine speed is greater than the threshold, at least one intake and/or exhaust valve may open faster than an AFM solenoid can activate and deactivate a hydraulic mechanism. For example only, a hydraulic mechanism that activates while an intake/exhaust valve is open may cause undesirable vibrations, noise, or damage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   an active fuel management (AFM) control module that selectively enables and disables an AFM mode using at least one AFM valve, that selectively identifies a AFM fault based on timing of the AFM valve and that sets the AFM mode to disabled based on the AFM fault; and
   a solenoid fault correction module that selectively opens and closes the at least one AFM valve when the AFM mode is disabled and when the AFM fault is asserted.

2. The engine control system of claim 1 wherein the AFM control module selectively deactivates at least one engine cylinder when the AFM mode is enabled.

3. The engine control system of claim 1 wherein the AFM control module selectively resets the AFM fault and enables and disables the AFM mode based on an output from the solenoid fault correction module.

4. The engine control system of claim 1 wherein the solenoid fault correction module includes:
   a solenoid maintenance module that selectively opens and closes the at least one AFM valve during the AFM fault; and
   a solenoid diagnostic module that indicates whether an AFM solenoid valve passed a diagnostic test.

5. The engine control system of claim 4 wherein the solenoid maintenance module determines a number of times the solenoid diagnostic module performed the diagnostic test using a counter.

6. The engine control system of claim 4 wherein the solenoid maintenance module stores a plurality of results of the diagnostic test.

7. The engine control system of claim 4 wherein the solenoid maintenance module opens and closes the at least one AFM valve during the AFM fault based on at least one engine operating condition.

8. The engine control system of claim 7 wherein the at least one operating condition includes engine speed.

9. A method of controlling an engine comprising:
   selectively enabling and disabling an AFM mode using at least one AFM valve;
   selectively identifying an AFM fault based on timing of the AFM valve;
   selectively setting the AFM mode to disabled based on the AFM fault; and
   selectively opening and closing the at least one AFM valve when the AFM mode is disabled and when the AFM fault is asserted.

10. The method of claim 9 further comprising selectively deactivating at least one engine cylinder when the AFM mode is enabled.

11. The method of claim 9 further comprising:
    selectively resetting the AFM fault and selectively enabling and disabling the AFM mode based on an output from a solenoid fault correction module.

12. The method of claim 9 wherein the selectively opening and closing the at least one AFM valve when the AFM mode is disabled further comprises:
    indicating whether an AFM solenoid valve passed diagnostic test.

13. The method of claim 12 further comprising determining a number of times the method performed the diagnostic test using a counter.

14. The method of claim 12 further comprising storing a predetermined number results of the diagnostic test.

15. The method of claim 14 further comprising opening and closing the at least one AFM valve during the AFM fault based on at least one engine operating condition.

16. The method of claim 15 wherein the at least one engine operating condition includes engine speed.

17. The engine control system of claim 1, wherein the solenoid fault correction module selectively opens and closes the at least one AFM valve when the AFM mode is disabled, when the AFM fault is asserted and when engine speed is greater than 1500 rpm.

18. The method of claim 9 further comprising selectively opening and closing the at least one AFM valve when the AFM mode is disabled, when the AFM fault is asserted and when engine speed is greater than 1500 rpm.

* * * * *